(12) United States Patent
Men

(10) Patent No.: US 8,647,027 B2
(45) Date of Patent: Feb. 11, 2014

(54) MILLING CUTTER AND CUTTING INSERT HAVING REAR PROTUBERANCE THEREFOR

(75) Inventor: Yuri Men, Haifa (IL)

(73) Assignee: Iscar, Ltd., Tefen (IL)

( * ) Notice: Subject to any disclaimer, the term of this patent is extended or adjusted under 35 U.S.C. 154(b) by 148 days.

(21) Appl. No.: 13/223,960

(22) Filed: Sep. 1, 2011

(65) Prior Publication Data

US 2012/0070238 A1    Mar. 22, 2012

(30) Foreign Application Priority Data

Sep. 19, 2010  (IL) .......................................... 208253

(51) Int. Cl.
B23C 5/14    (2006.01)
B23C 5/20    (2006.01)

(52) U.S. Cl.
USPC ................ 407/103; 407/113; 407/42; 407/35

(58) Field of Classification Search
USPC ........... 407/113, 101–104, 34, 35, 42, 43, 47, 407/48
See application file for complete search history.

(56) References Cited

U.S. PATENT DOCUMENTS

| | | | | |
|---|---|---|---|---|
| 3,158,922 A | * | 12/1964 | Reese | 407/40 |
| 3,466,720 A | | 9/1969 | Stier | |
| 3,621,549 A | * | 11/1971 | Billups | 407/3 |
| 4,512,689 A | * | 4/1985 | Bylund | 407/40 |
| 4,525,109 A | * | 6/1985 | Bylund | 407/36 |
| 4,536,037 A | * | 8/1985 | Rink | 299/109 |
| 4,593,734 A | * | 6/1986 | Wallace | 144/136.9 |
| 4,699,549 A | | 10/1987 | Shimomura et al. | |
| 5,222,841 A | * | 6/1993 | Simkhovich | 407/5 |
| 5,580,194 A | * | 12/1996 | Satran et al. | 407/40 |
| 5,632,576 A | * | 5/1997 | Storch | 407/32 |
| 5,782,589 A | * | 7/1998 | Cole | 408/233 |
| 5,893,683 A | * | 4/1999 | Johnson | 407/42 |
| 5,924,824 A | * | 7/1999 | Satran et al. | 407/34 |
| 5,951,213 A | | 9/1999 | Fauser et al. | |
| 5,961,259 A | * | 10/1999 | Ziegler | 408/181 |
| 5,971,671 A | * | 10/1999 | Mina | 407/42 |

(Continued)

FOREIGN PATENT DOCUMENTS

JP    2003 159611 A        6/2003
JP    2007268695 A    *  10/2007

(Continued)

OTHER PUBLICATIONS

International Search Report dated Dec. 19, 2011 issued in counterpart International Application No. PCT/IL2011/000594.

*Primary Examiner* — Andrea Wellington
*Assistant Examiner* — Sara Addisu
(74) *Attorney, Agent, or Firm* — Womble Carlyle

(57) ABSTRACT

A cutting insert for mounting in a socket on an insert holder of a milling cutter. The cutting insert has opposing top and bottom surfaces and a peripheral surface extending therebetween, forming one or two cutting edges. The peripheral surface has a front arcuate surface and a rear surface. The rear surface has a protuberance that extends in a direction away from a central region of the front surface. The protuberance is located in the socket. The socket includes a first socket side abutment surface for providing primarily axial support for the cutting insert against cutting forces acting in an axial rearward direction during a milling operation.

20 Claims, 6 Drawing Sheets

(56) References Cited

U.S. PATENT DOCUMENTS

| | | | |
|---|---|---|---|
| 6,048,140 A * | 4/2000 | Johnson | 407/42 |
| 6,071,045 A * | 6/2000 | Janness | 407/42 |
| 6,120,219 A * | 9/2000 | Satran et al. | 407/113 |
| 6,132,146 A * | 10/2000 | Satran et al. | 407/40 |
| 6,158,927 A * | 12/2000 | Cole et al. | 407/48 |
| 6,270,292 B1 | 8/2001 | Satran et al. | |
| 6,273,649 B1 * | 8/2001 | Ziegler | 407/101 |
| 6,503,027 B2 * | 1/2003 | Men | 407/33 |
| 6,527,485 B1 * | 3/2003 | Little | 407/24 |
| 6,536,996 B2 * | 3/2003 | Satran et al. | 407/34 |
| 6,582,165 B1 * | 6/2003 | Baba | 408/233 |
| 6,607,333 B2 * | 8/2003 | Satran et al. | 407/33 |
| 6,733,215 B2 * | 5/2004 | Isaksson | 407/114 |
| 7,001,115 B2 * | 2/2006 | Erickson et al. | 407/113 |
| 7,044,695 B2 * | 5/2006 | Stojanovski | 409/234 |
| 7,168,895 B2 * | 1/2007 | Koskinen et al. | 409/140 |
| 7,226,249 B2 * | 6/2007 | Tsuchitani et al. | 407/42 |
| 7,270,503 B2 * | 9/2007 | Berger et al. | 408/199 |
| 7,326,006 B2 * | 2/2008 | Hecht et al. | 407/48 |
| 7,597,508 B2 * | 10/2009 | Hecht | 407/101 |
| 7,677,282 B2 * | 3/2010 | Stager | 144/241 |
| RE41,275 E * | 4/2010 | Tsuda et al. | 407/107 |
| 7,794,182 B2 * | 9/2010 | Lehto et al. | 407/35 |
| 7,887,266 B2 * | 2/2011 | Hecht | 407/46 |
| 8,137,034 B2 * | 3/2012 | Noureddine | 407/11 |
| 8,157,486 B2 * | 4/2012 | Hecht | 407/5 |
| 8,177,459 B2 * | 5/2012 | Hughes et al. | 407/40 |
| 8,192,114 B2 * | 6/2012 | Chang | 408/224 |
| 8,529,166 B2 * | 9/2013 | Hecht | 407/103 |
| 2009/0035075 A1 * | 2/2009 | Hecht et al. | 407/104 |
| 2010/0061814 A1 * | 3/2010 | Hecht | 407/92 |
| 2010/0124465 A1 | 5/2010 | Morrison et al. | |
| 2010/0254773 A1 * | 10/2010 | Hecht | 407/100 |
| 2012/0045288 A1 * | 2/2012 | Morgulis | 407/47 |

FOREIGN PATENT DOCUMENTS

| | | |
|---|---|---|
| WO | WO 01/76796 A1 | 10/2001 |
| WO | WO 2008004967 A1 * | 1/2008 |
| WO | WO 2010/092574 A1 | 8/2010 |
| WO | WO 2010/100953 A1 | 9/2010 |

* cited by examiner

MILLING CUTTER AND CUTTING INSERT HAVING REAR PROTUBERANCE THEREFOR

FIELD OF THE INVENTION

The subject matter of the present application relates to milling cutters of the type in which a cutting insert, having a protuberance, is retained in an insert pocket by means of a retaining screw.

BACKGROUND OF THE INVENTION

Milling cutters, for example, ball end milling cutters, very often have to withstand high axial cutting forces whilst remaining securely fastened to the tool holder. It is important in such cases that the retaining screw be protected from the cutting forces; otherwise it may plastically bend or even break.

U.S. Pat. No. 5,951,213 discloses a milling cutter which has a shaft and a rounded end head that has two plate seats at the head, which are diametrically opposite each other. The plate seats are adapted to receive asymmetrical cutting inserts each having a central through hole. The cutting inserts are identical, and are plate-like elements of generally pointed, elongated leaf or prune-pit shape, defining two end points or tips, and having, each, two dissimilar cutting edges. When one cutting edge is worn, an insert can be indexed (rotated) about its through hole and repositioned in a different plate seat to present the other cutting edge for cutting operations.

However, there are some disadvantages. Firstly, the maximum number of inserts that can be attached to the cutting tool is limited to two. Secondly, the geometry of the insert is such that the contour of the cutting edge of the insert consists of a quarter-circle (that is, where the angle subtended at the centre of the circle is 90°) and an extending straight line. This limits the maneuverability of the cutting tool. Thirdly, when the cutting tool is drilling in a substantially downward or upward motion, none of the abutment surfaces are perpendicular to the direction of the drilling, thus avoiding optimal absorption of the axial forces.

U.S. Pat. No. 3,466,720 discloses a reversible throw-away cutting insert for mounting on an appropriate tool holder, having symmetrically disposed equal upper and lower faces forwardly diverging from each other.

However, the V-shaped notches are used for insert locating and ease of mounting and do not serve the purpose of absorbing any axial forces. Secondly, the cutting edge is suitable for machine lathe turning of a cylindrical work piece, and is not appropriate for any type of drilling.

U.S. Pat. No. 6,270,292 discloses a cutting insert for mounting on a tool holder of a cutting tool, comprising a front cutting portion having an operative front surface associated with at least one cutting edge, and a trailing mounting portion. The trailing mounting portion has upper, lower and side walls extending from the front cutting portion to a rear abutment wall of the trailing mounting portion oriented generally co-directionally with said operative front surface.

While the geometry of the insert has been optimized so as to enable it to have relatively long cutting edges with trailing mounting portions being of substantially reduced dimensions, the cutting tool can not be used for making ball-end shaped holes. In addition, at least six cutting inserts must be installed in the tool holder, which is time consuming when inserts need to be replaced.

US Published Patent Application 2010/0124465 discloses a cutting insert that is capable of being mounted within an insert-receiving pocket of a ball end mill. The cutting insert includes a first substantially planar surface, a second substantially planar surface, a first curvilinear side surface, a second curvilinear side surface, a first pair of cutting edges formed at an intersection between the first substantially planar surface and the first and second curvilinear side surfaces, and a second pair of cutting edges formed at an intersection between the second substantially planar surface and the first and second curvilinear side surfaces. The first substantially planar surface is substantially parallel to the second substantially planar surface. The cutting insert is mirror symmetric about all three axes. Thus, for example, when one member of a given pair of cutting edges is worn, the insert can be indexed (rotated) about its central through hole, i.e., about its z-axis to present the other member of that pair for cutting operations.

Again, there are some notable disadvantages. Firstly, the maximum number of inserts that can be attached to the cutting tool is limited to two. Secondly, the geometry of the insert is such that the contour of the cutting edge of the insert consists of a quarter-circle (that is, where the angle subtended at the centre of the circle is 90°). This limits the maneuverability of the cutting tool. Thirdly, when the cutting tool is drilling in a substantially downward or upward motion, none of the abutment surfaces are perpendicular to the direction of the drilling, thus avoiding optimal absorption of the axial forces.

SUMMARY OF THE INVENTION

In accordance with some embodiments of the subject matter of the present application there is provided a cutting insert comprising:

opposing top and bottom surfaces and a peripheral surface extending therebetween, the peripheral surface comprising a front arcuate surface and a rear surface, the front arcuate surface meeting the top and bottom surfaces at two edges, at least one of the edges comprising a cutting edge;

the rear surface comprising a central back surface, two side abutment surfaces and two rear abutment surfaces, the central back surface being located between the two side abutment surfaces which extend forwardly therefrom, each side abutment surface being adjacent to a respective rear abutment surface, the central back surface and the two side abutment surfaces being located on a protuberance of the cutting insert, the protuberance protruding beyond the rear abutment surfaces in a direction away from a central region of the front arcuate surface; and an insert through hole passing between the top and bottom surfaces.

According to other embodiments of the subject matter of the present application, there is provided an insert holder having a longitudinal axis of rotation defining a forward to rear direction, a forward end of the insert holder having a plurality of identical insert pockets, each insert pocket comprising:

a base surface;
a side wall comprising side contact surfaces;
a pocket hole in the base surface; and
a socket in the side wall adjacent the base surface, the socket comprising a bottom socket surface, a back socket surface and two socket side abutment surfaces, each socket side abutment surface extending from an adjacent side contact surface, wherein:

the socket is configured and dimensioned to receive a portion of a cutting insert retained in said each insert pocket with only one of the two socket side abutment surfaces abutting a side of said portion.

According to still other embodiments of the subject matter of the present application, there is also provided a milling cutter comprising:

the insert holder; and a cutting insert retained in each insert pocket of the insert holder by a retaining screw, wherein:

the retaining screw is located in the insert through hole and threadingly received in the pocket hole;

the first and second side contact surfaces of the insert holder abut the first and second rear abutment surfaces of the cutting insert respectively;

the base surface of the insert holder abuts the bottom surface of the cutting insert; and the protuberance is located in the socket with the first side abutment surface in abutment with the first socket side abutment surface.

According to still other embodiments of the subject matter of the present application, there is also provided a double-sided cutting insert comprising:

opposing top and bottom surfaces and a peripheral surface extending therebetween, the peripheral surface comprising a front arcuate surface and a rear surface, the front arcuate surface meeting the top and bottom surfaces at two edges, each of the edges comprising a cutting edge;

the rear surface comprising a central back surface, two side abutment surfaces and two rear abutment surfaces, the central back surface being located between the two side abutment surfaces which extend forwardly therefrom, each side abutment surface being adjacent to a respective rear abutment surface, the central back surface and the two side abutment surfaces being located on a protuberance of the cutting insert, the protuberance protruding beyond the rear abutment surfaces in a direction away from a central region of the front arcuate surface; and an insert through hole passing between the top and bottom surfaces; wherein:

the cutting insert has 180° rotational symmetry about an axis of symmetry which passes through the central back surface, the insert through hole and the front arcuate surface; and the cutting insert is non-indexable about the insert through hole.

BRIEF DESCRIPTION OF THE FIGURES

For a better understanding of the present application and to show how the same may be carried out in practice, reference will now be made to the accompanying drawings, in which.

Figure 1:
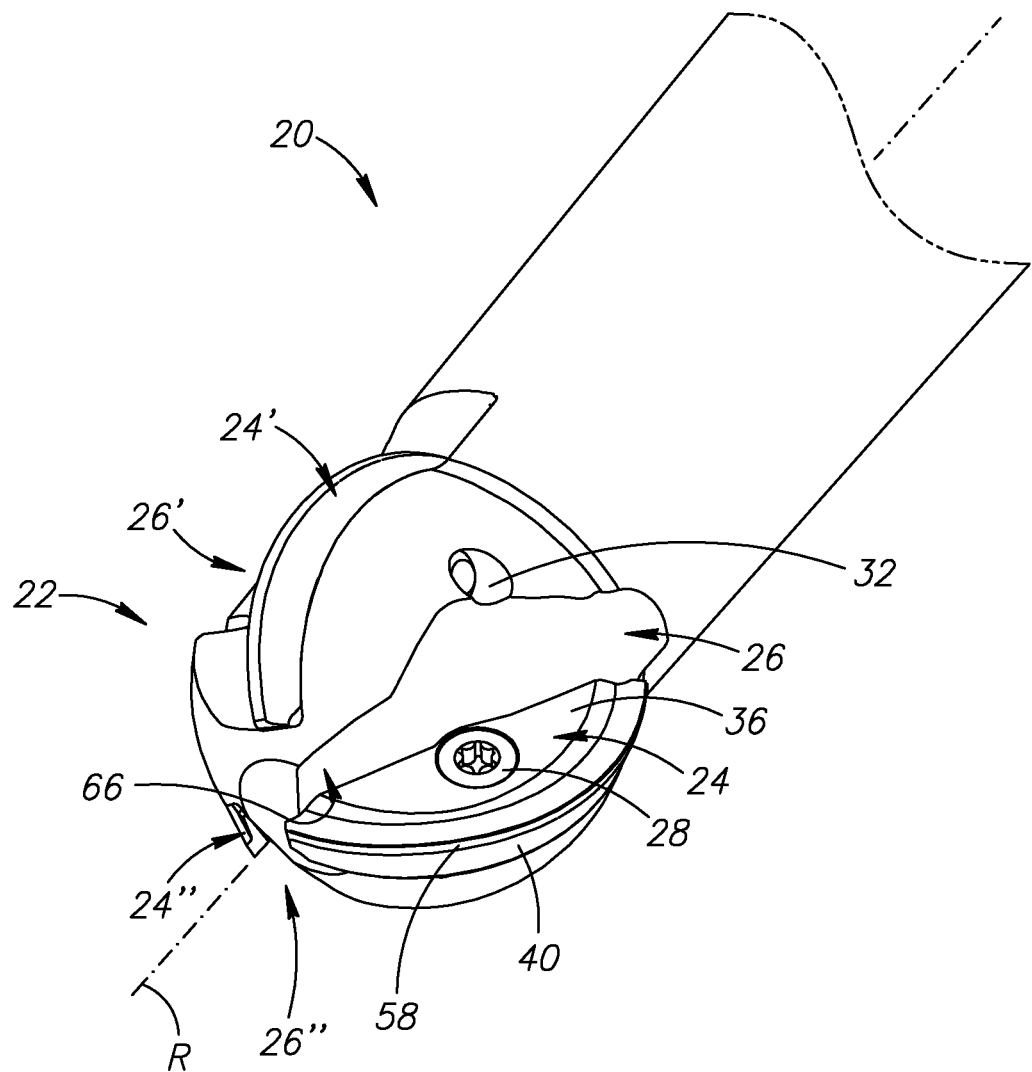
FIG. 1 is a perspective view of a milling cutter in accordance with some embodiments of the present application.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present application will be described. For purposes of explanation, specific configurations and details are set forth in order to provide a thorough understanding of the present application. However, it will also be apparent to one skilled in the art that the present application may be practiced without the specific details presented herein. Furthermore, well-known features may be omitted or simplified in order not to obscure the present application.

Figure 2:
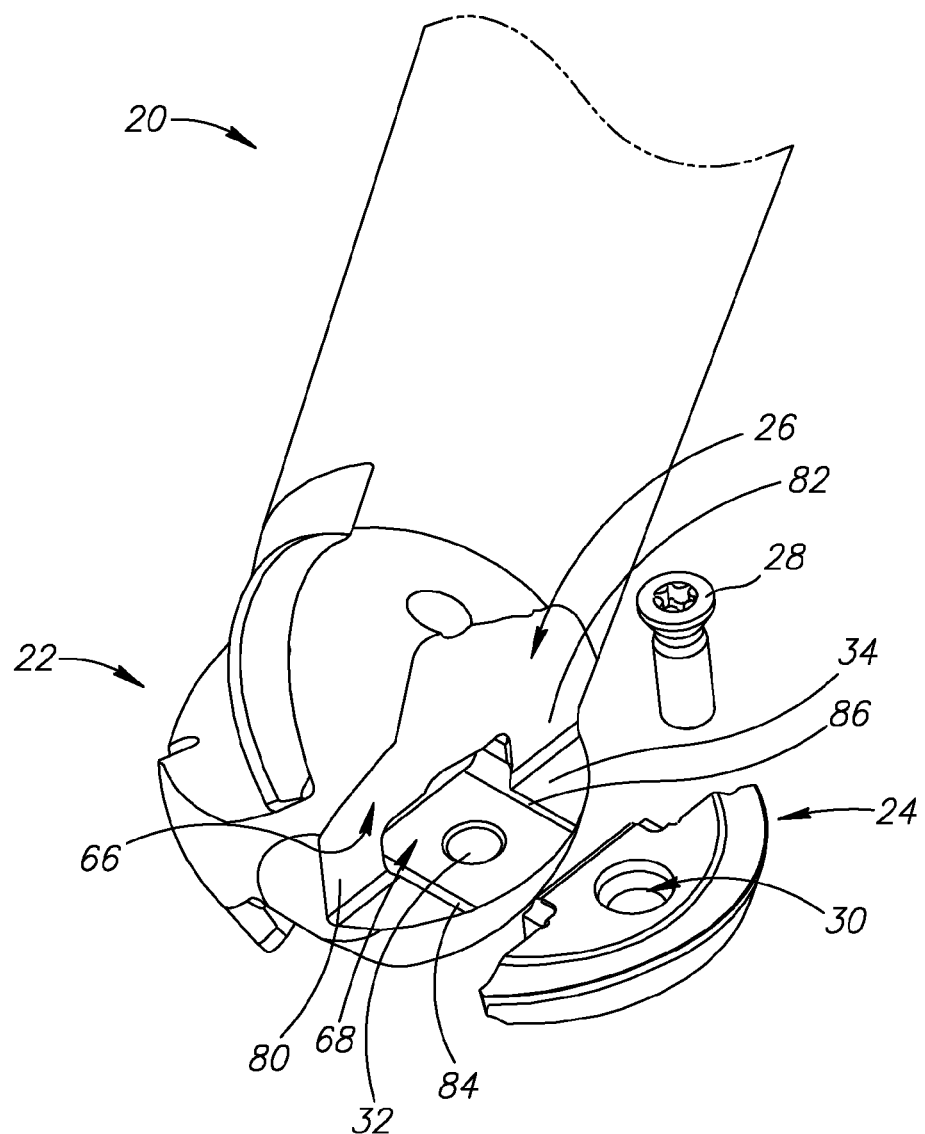
FIG. 2 shows the milling cutter of FIG. 1 with a cutting insert removed from an insert pocket.

Attention is first drawn to FIGS. 1 and 2, showing a milling cutter 20 in accordance with some embodiments of the present application. The milling cutter 20 is in the form of an insert holder 22 having a plurality of identical milling cutting inserts 24 removably retained in a corresponding plurality of identical insert pockets 26. The milling cutter 20 has a longitudinal axis of rotation R defining a forward to rear direction, with the insert pockets 26 and the cutting inserts 24 located at the forward end of the milling cutter 20. Each cutting insert 24 is secured to a respective insert pocket 26 by means of a retaining screw 28 passing through an insert through hole 30 in the cutting insert 24 and threadingly received in a pocket hole 32 in a base surface 34 of the insert pocket 26. The insert holder 22 may be manufactured from a first material and the cutting insert 24 from a second harder material. In accordance with some embodiments, the milling cutter 20 may have two to four cutting inserts 24 retained in corresponding insert pockets 26.

Figure 3:
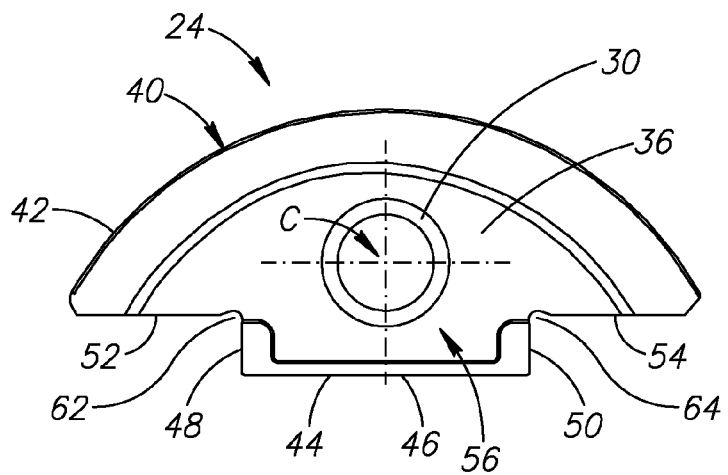
FIG. 3 is a top view of the cutting insert in accordance with a first embodiment of the present application.
Figure 4:
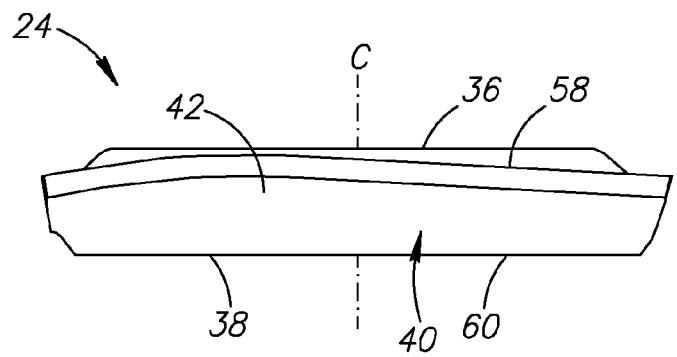
FIG. 4 is a front view of the cutting insert shown in FIG. 3.
Figure 5:
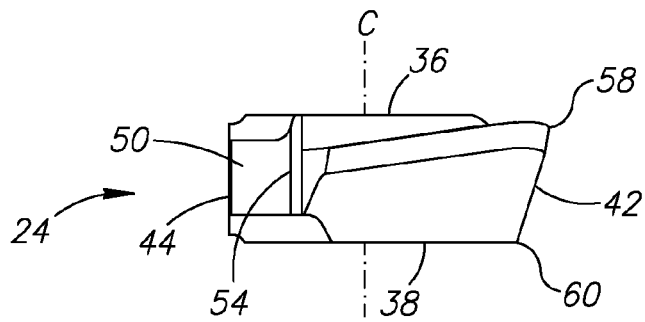
FIG. 5 is a side view of the cutting insert shown in FIG. 3.

As shown in FIGS. 3, 4 and 5, the cutting insert 24 includes a top surface 36 and an opposing bottom surface 38 with the insert through hole 30 having a central axis C and passing through the top and bottom surfaces 36, 38. A peripheral surface 40 extends between the top surface 36 and the bottom surface 38. The peripheral surface 40 encircles the entire cutting insert 24. The peripheral surface 40 contains a front arcuate surface 42 and a rear surface 44.

The rear surface 44 is multifaceted and comprises a central back surface 46, two side abutment surfaces 48, 50, a first side abutment surface 48 and a second side abutment surface 50 and two rear abutment surfaces 52, 54, a first rear abutment surface 52 and a second rear abutment surface 54. In accordance with some embodiments, the two side abutment surfaces 48, 50 may be parallel to each other and perpendicular to the central back surface 46. In accordance with some embodiments, the two rear abutment surfaces 52, 54 may be flat and coplanar. The central back surface 46 is located between the two side abutment surfaces 48, 50. In cutting insert 24, the two side abutment surfaces 48, 50 extend forwardly from the central back surface 46, which is oriented transversely thereto. Each side abutment surface 48, 50 is adjacent to a respective rear abutment surface 52, 54. In cutting insert 24, the central back surface 46 and the two side abutment surfaces 48, 50 are located on a protuberance 56 of the cutting insert 24. As seen in the figures, the central back surface 46 is located on a rearwardly facing wall of the protuberance 56 while the two side abutment surfaces 48, 50 are located on laterally outwardly facing walls of protuberance 56. The protuberance 56 protrudes beyond the rear abutment surfaces 52, 54 in a direction away from a central region of the front arcuate surface 42.

The cutting insert 24 shown in FIGS. 3 to 5 is in accordance with a first embodiment of the present application. In accordance with the first embodiment, a cutting edge 58 is formed where the front arcuate surface 42 meets the top surface 36. Further in accordance with the first embodiment, an edge 60, which is not a cutting edge, is formed where the front arcuate surface 42 meets the bottom surface 38, that is, the cutting insert 24 is "one-sided".

In accordance with some embodiments, in a top view of the cutting insert 24, the cutting edge 58 may lie on a circular arc where the angle α subtended at the centre of the circle may be 120°.

It should be appreciated that with the first angle α being greater than 90°, in addition to performing milling operations with cutting forces acting in the axial rearward direction, the milling cutter 20 is able to perform milling operations with cutting forces acting in the axial forward direction, and thus operate with an increased range of maneuverability.

As shown in FIGS. 4 and 5, in some embodiments of the present application, the width of the front arcuate surface 42, between the top and bottom surfaces 36, 38 may be smaller at the sides than in the middle. Furthermore, as seen in FIG. 5, the front arcuate surface 42 may be inclined inwardly in a direction away from the top surface 36.

Figure 7:
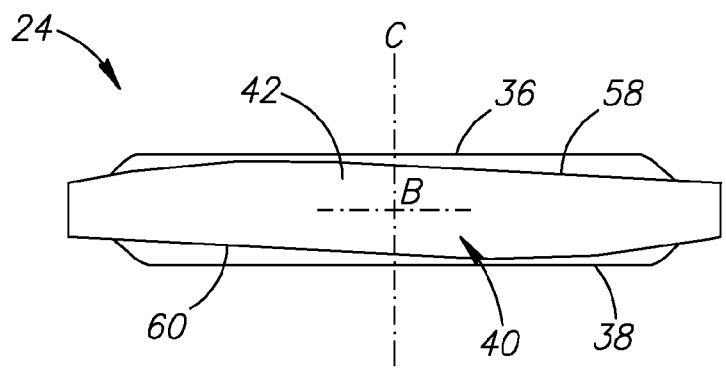
FIG. 7 is a front view of the cutting insert shown in FIG. 6.

As shown in FIGS. 4 and 7, in some embodiments of the present application, the top and bottom surfaces 36, 38 may be substantially planar.

Figure 6:
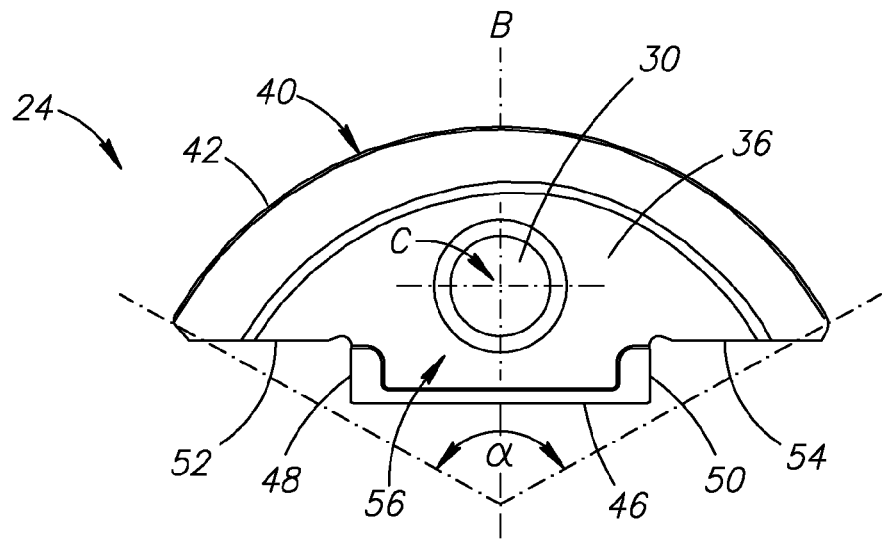
FIG. 6 is a top view of the cutting insert in accordance with a second embodiment of the present application.
Figure 9:
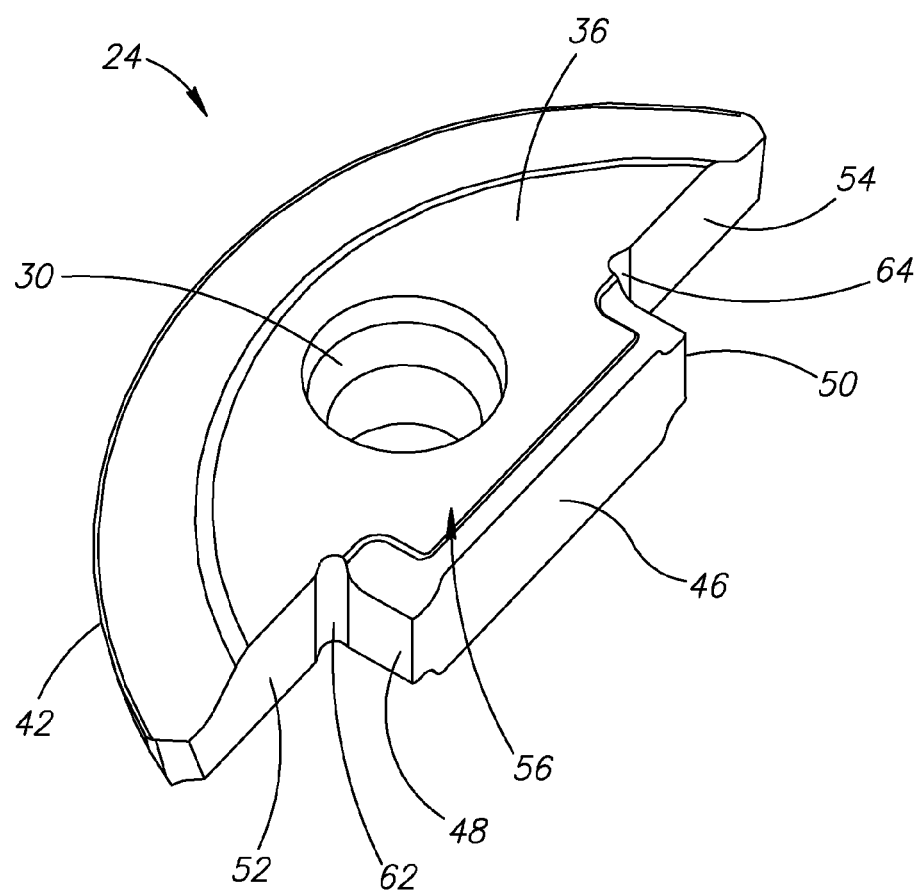
FIG. 9 is a rear perspective view of the cutting insert in accordance with some embodiments of the present application.

As shown in FIGS. 3, 6 and 9, there may be a stress relief groove 62, 64 on each side of the protuberance 56, running between the protuberance 56 and the rear abutment surfaces 52, 54.

Figure 8:
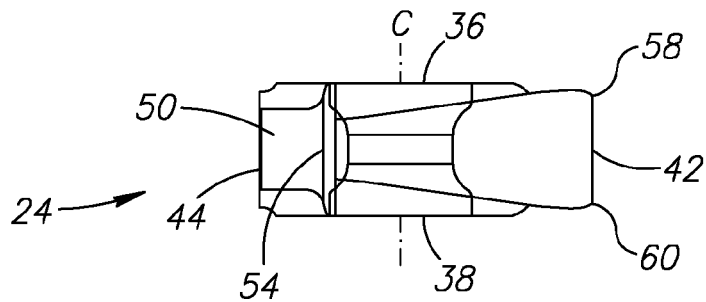
FIG. 8 is a side view of the cutting insert shown in FIG. 6.

Attention is drawn to FIGS. 6, 7 and 8, showing a cutting insert 24 in accordance with a second embodiment of the present application. In accordance with the second embodiment, a further cutting edge 60 is formed where the front arcuate surface 42 meets the bottom surface 38. The cutting edges 58, 60 formed at the top and bottom surfaces 36, 38 are identical so that the insert is double-sided, and can be reversed.

In accordance with the second embodiment, the cutting insert 24 exhibits 180° rotational symmetry about an axis of symmetry B. The axis of symmetry B passes through the central back surface 46, the central axis C of the through hole 30 and also passes through the front arcuate surface 42. It is noted, however, that the cutting insert 24 is non-indexable about its through hole 30, unlike the inserts disclosed in aforementioned U.S. Pat. No. 5,951,213 and U.S. Published Application No. 2010/0124465. In the shown embodiment, the axis of symmetry B is perpendicular to and bisects the central back surface 46.

Figure 10:
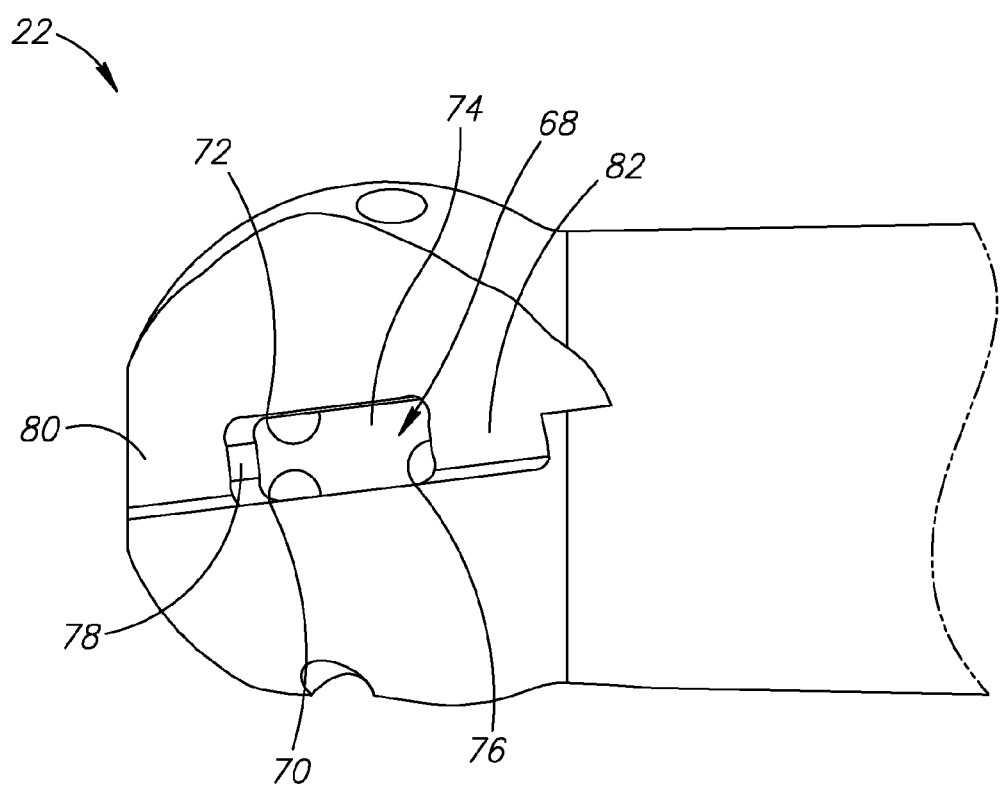
FIG. 10 is a side view of an insert holder in accordance with some embodiments of the present application.

As can be seen in FIGS. 2 and 10, each insert pocket 26 has a side wall 66 extending generally upright from the base surface 34. In accordance with some embodiments, the base surface 34 and the side wall 66 may be perpendicular to each other. A socket 68 is formed in the side wall 66 adjacent the base surface 34. The socket 68 has a bottom socket surface 70, an opposing top socket surface 72, a back socket surface 74 and two socket side abutment surfaces 76, 78, a first socket side abutment surface 76 and a second socket side abutment surface 78. The two socket side abutment surfaces 76, 78 may be generally parallel to one another and transverse to the longitudinal axis of rotation (R). The back socket surface 74 and socket side abutment surfaces 76, 78 are situated between the top and bottom socket surfaces 72, 70.

Each socket side abutment surface 76, 78 extends from the adjacent back socket surface 74 to the side wall 66. The first socket side abutment surface 76 provides primarily axial support for the cutting insert 24 against cutting forces acting in the axial rearward direction. Extending along the pocket side wall 66 from adjacent the first and second socket side abutment surfaces 76, 78 and adjacent the insert pocket base surface 34 are first and second side contact surfaces 82, 80, respectively. In accordance with some embodiments, the first and second side contact surfaces 82, 80 are flat and coplanar, not unlike the two rear abutment surfaces 52, 54 formed on the cutting insert 24. The first and second side contact surfaces 82, 80 provide primarily radial support for the cutting insert 24.

In other embodiments of the present application (not shown), the socket 68 may not include the top socket surface 72.

As can be seen in FIG. 2, each insert pocket 26 has two grooves 84, 86 on the base surface 34 running in a direction perpendicular to the side wall 66. These grooves 84, 86 are an outcome of the production method for creating the socket 68.

The seating and support of the cutting insert 24 in the insert pocket 26 will be described with reference to FIGS. 1, 2 and 10. When the cutting insert 24 is located in the insert pocket 26 of the insert holder 22, the protuberance 56 of the cutting insert 24 is located in the socket 68 of the insert holder 22. According to some embodiments, there are four abutment regions at which the cutting insert 24 and the insert pocket 26 engage each other. The first abutment region is formed between the bottom surface 38 of the cutting insert 24 and the base surface 34 of the insert holder 22. The second abutment region is formed between the first rear abutment surface 52 of the cutting insert 24 and the first side contact surface 82 of the insert holder 22. The third abutment region is formed between the second rear abutment surface 54 of the cutting insert 24 and the second side contact surface 80 of the insert holder 22. The fourth abutment region arises when the protuberance 56 engages the socket 68 and is formed between the first side abutment surface 48 and the first socket side abutment surface 76. The fourth abutment region provides primarily axial support for the cutting insert 24 against cutting forces acting on the cutting insert 24 in the axial rearward direction during a milling operation. Similarly, the second and third abutment regions provide primarily radial support for the cutting insert 24 against cutting forces acting on the cutting insert 24 during a milling operation.

It can be seen from the foregoing seating and support arrangement, then, that the central back surface 46 of the cutting insert 24, though located in the socket 74, remains unabutted by the back socket surface 74. It can further be seen that socket 68 is configured and dimensioned to receive a portion of a cutting insert retained in the associated insert pocket with only one of the two socket side abutment surfaces 76, 78 abutting a side of that portion.

The second, third and fourth abutment regions are generated by designing the insert through hole 30 to be suitably eccentric in relation to the pocket hole 32. Due to the eccentricity, when the retaining screw 28 is tightened, a biasing force is applied to the cutting insert 24 forcing the cutting insert 24 against the insert pocket 26 at the second, third and fourth abutment regions. This arrangement is used for most milling operations in which the axial cutting forces are directed in the forward to rear direction. In such milling operations, there is no contact between the second side abutment surface 50 and the second socket side abutment surface 78. However, for cutting operations for which the axial cutting forces are directed in the rear to forward direction there will be no contact between the first side abutment surface 48 and the first socket side abutment surface 76, so that these two surfaces will not form the fourth abutment region. Instead, there will be contact between the second side abutment surface 50 and the second socket side abutment surface 78 thereby forming the fourth abutment region.

What is claimed is:

1. A cutting insert (24) comprising:
   opposing top and bottom surfaces (36, 38) and a peripheral surface (40) extending therebetween, the peripheral surface (40) comprising a front arcuate surface (42) and a rear surface (44), the front arcuate surface (42) meeting the top and bottom surfaces (36, 38) at two edges (58, 60), at least one of the edges (58) comprising a cutting edge;
   the rear surface (44) comprising a central back surface (46), two side abutment surfaces (48, 50) and two rear abutment surfaces (52, 54), the central back surface (46) being located between the two side abutment surfaces (48, 50) which extend forwardly therefrom, each side abutment surface (48, 50) being adjacent to a respective rear abutment surface (52, 54), the central back surface (46) and the two side abutment surfaces (48, 50) being located on a protuberance (56) of the cutting insert (24), the protuberance (56) protruding beyond the rear abutment surfaces (52, 54) in a direction away from a central region of the front arcuate surface (42); and
   an insert through hole (30) passing between the top and bottom surfaces (36, 38).

2. The cutting insert (24) according to claim 1, wherein the cutting edge (58) lies on an imaginary circle and subtends an angle ($\alpha$) of 120° at the center of the circle.

3. The cutting insert (24) according to claim 1, wherein the two side abutment surfaces (48, 50) are parallel to each other and perpendicular to the central back surface (46).

4. The cutting insert (24) according to claim 1, wherein the two rear abutment surfaces (52, 54) are flat and coplanar.

5. The cutting insert (24) according to claim 1, wherein the cutting insert is non-indexable about the insert through hole (30).

6. The cutting insert (24) according to claim 1, wherein;
   the cutting insert is double-sided;
   each of the edges (58, 60) comprises a cutting edge; and
   the cutting insert (24) has 180° rotational symmetry about an axis of symmetry (B) which passes through the central back surface (46), the through hole (30) and the front arcuate surface (42).

7. The cutting insert (24) according to claim 6, wherein;
   the axis of symmetry (B) is perpendicular to the central back surface (46) and bisects the central back surface (46).

8. The cutting insert (24) according to claim 6, wherein the cutting edge (58) lies on an imaginary circle and subtends an angle ($\alpha$) of 120° at the center of the circle.

9. The cutting insert (24) according to claim 6, wherein the two side abutment surfaces (48, 50) are parallel to each other and perpendicular to the central back surface (46).

10. The cutting insert (24) according to claim 6, wherein the two rear abutment surfaces (52, 54) are flat and coplanar.

11. The cutting insert (24) according to claim 6, wherein the cutting insert is non-indexable about the through hole (30); and
    the two side abutment surfaces (48, 50) are parallel to each other and perpendicular to the central back surface (46).

12. An insert holder (22) having a longitudinal axis of rotation (R) defining a forward to rear direction, a forward end of the insert holder having a plurality of identical insert pockets (26), each insert pocket (26) comprising:
    a base surface (34);
    a side wall (66) comprising side contact surfaces (82, 80);
    a pocket hole (32) in the base surface (34); and
    a socket (68) in the side wall (66) adjacent the base surface (34), the socket (68) comprising a bottom socket surface (70), a back socket surface (74) and two socket side abutment surfaces (76, 78), each socket side abutment surface (76, 78) extending from an adjacent side contact surface (82, 80), wherein:
    the socket (68) is configured and dimensioned to receive a portion of a cutting insert retained in said each insert pocket with only one of the two socket side abutment surfaces (76, 78) abutting a side of said portion.

13. The insert holder (22) according to claim 12, wherein the base surface (34) and the side wall (66) are perpendicular to each other.

14. The insert holder (22) according to claim 12, wherein the two socket side abutment surfaces (76, 78) are parallel to one another and transverse to the longitudinal axis of rotation (R).

15. The insert holder (22) according to claim 14, wherein the socket (68) further comprises a top socket surface (72) which opposes the bottom socket surface (70).

16. A milling cutter (20) comprising:
    the insert holder (22) according to claim 12; and
    a cutting insert (24) according to claim 1 retained in each insert pocket of the insert holder (22) by a retaining screw (28), wherein:
    the retaining screw (28) is located in the insert through hole (30) and threadingly received in the pocket hole (32);
    the first and second side contact surfaces (82, 80) of the insert holder (22) abut the first and second rear abutment surfaces (52, 54) of the cutting insert (24) respectively;
    the base surface (34) of the insert holder (22) abuts the bottom surface (38) of the cutting insert (24); and
    the protuberance (56) is located in the socket (68) with the first side abutment surface (48) in abutment with the first socket side abutment surface (76) and with no contact between the second side abutment surface (50) and the second socket side abutment surface (78).

17. A double-sided cutting insert (24) comprising:
    opposing top and bottom surfaces (36, 38) and a peripheral surface (40) extending therebetween, the peripheral surface (40) comprising a front arcuate surface (42) and a rear surface (44), the front arcuate surface (42) meeting the top and bottom surfaces (36, 38) at two edges (58, 60), each of the edges (58, 60) comprising a cutting edge;
    the rear surface (44) comprising a central back surface (46), two side abutment surfaces (48, 50) and two rear abutment surfaces (52, 54), the central back surface (46) being located between the two side abutment surfaces (48, 50) which extend forwardly therefrom, each side abutment surface (48, 50) being adjacent to a respective rear abutment surface (52, 54), the central back surface (46) and the two side abutment surfaces (48, 50) being located on a protuberance (56) of the cutting insert (24), the protuberance (56) protruding beyond the rear abutment surfaces (52, 54) in a direction away from a central region of the front arcuate surface (42); and
    an insert through hole (30) passing between the top and bottom surfaces (36, 38); wherein:
    the cutting insert (24) has 180° rotational symmetry about an axis of symmetry (B) which passes through the central back surface (46), the insert through hole (30) and the front arcuate surface (42); and
    the cutting insert is non-indexable about the insert through hole (30).

18. The double-sided cutting insert (24) according to claim 17, wherein:
   the axis of symmetry (B) is perpendicular to, and bisects, the central back surface (46).

19. The insert holder (22) according to claim 12, wherein the first and second side contact surfaces (82, 80) are flat and coplanar.

20. The insert holder (22) according to claim 12, wherein the socket (68) further comprises a top socket surface (72) which opposes the bottom socket surface (70).

* * * * *